United States Patent Office 2,765,224
Patented Oct. 2, 1956

2,765,224
HERBICIDE

Joseph A. Lambrech, Charleston, W. Va., assignor to Union Carbide and Carbon Corporation, a corporation of New York No Drawing. Application November 3, 1951,
Serial No. 254,797

11 Claims. (Cl. 71—2.6)

This invention relates to chemical products which have been found to be of value for the treatment of fields by either the so-called "pre-emergence" or "post-emergence" treatment to keep down the growth of grass and weeds, yet have substantially no effect on certain desirable crops in the treated field or in adjoining fields.

The undesirability of a mixed growth of weed plants and crop plants is universally acknowledged. Recently it has been found that certain chemicals with powerful hormonal action will adversely affect certain plants in foliage, notably broad-leaved plants, and not affect so adversely narrow-leaved plants. Difficulty in the use of these chemicals arises, however, where a field of broad-leaved crop plants is in foliage next to a treated field, as the hormonal chemicals are carried by the wind to the broad-leaved crop plants and adversely affect the desirable crop plants. The herbicide familiarly known as "2,4-D" (2,4-dichlorophenoxy acetic acid) and its salts or esters are difficult to control.

It is now found that if certain chemicals which are esters of 2,4-dichlorophenoxy ethanol are properly applied to the surface of the earth, the growth of the majority of weeds in the treated area can be inhibited, yet the growth of the seeds of crops which are planted relatively deeply is not adversely affected and the plant life of adjacent fields is substantially unaffected. This allows a field to be fitted, then planted with a crop plant whose seeds are naturally planted one inch or more below the surface, and then chemically treated with the assurance of a low weed count and at least a normal crop from the crop seeds. It is also found that certain of these chemicals will kill growing weeds and not certain growing crop plants in post-emergence treatments.

The invention includes the complete or full esters of 2,4-dichlorophenoxy ethanol, that is the monoesters of monobasic acids and the polyesters of polybasic acids, as well as the partial esters including the ester salts, for instance esters of the alcohol and dibasic acids wherein one of the acidic groups of the acid is esterified and the other acidic group is not esterified, either remaining in the compound as an acidic group or being neutralized with an inorganic group, for instance an alkali metal (as Na or K) or an alkaline earth (as Ca, Mg or Ba) or an ammonium group or an amine (as morpholine or a methanol or ethanol amine, for instance triethanol amine or similar material of low molecular weight). The acids used for esterification of the alcohol have from 1 to 18 carbon atoms. In general, aliphatic acids higher than stearic or oleic acid are too expensive for use as are cyclic acids higher than phthalic acid. The acids may be saturated or unsaturated, aliphatic or cyclic and monobasic or polybasic. It has been discovered that, in general, the presence of the acidic residue, that is the acyl group separated from the phenoxy group by the ethyl group, is highly desirable in these esters.

The materials contemplated herein are represented by the following:

1. 2-(2,4-dichlorophenoxy)ethyl oleate

R—O—CO—C17H33

R is

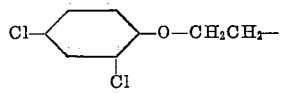

2. 2-(2,4-dichlorophenoxy)ethyl benzoate

R—O—CO—C6H5

3. Di[2-(2,4-dichlorophenoxy)ethyl]oxalate

R—O—CO
    |
    R—O—CO

4. Di[2-(2,4-dichlorophenoxy)ethyl]1-chloromaleate

R—O—CO—C—Cl
    ‖
    R—O—CO—CH 5. 2-(2,4-dichlorophenoxy)ethyl butyrate

R—O—CO—C3H7

6. 2-(2,4-dichlorophenoxy)ethyl acetate

R—O—CO—CH3

7. Di[2-(2,4-dichlorophenoxy)ethyl]malate $\qquad$ H
    $\qquad$ |
    R—O—CO—C—OH
    |
    R—O—CO—CH2

8. Di[2-(2,4-dichlorophenoxy)ethyl]tartrate $\qquad$ H
    $\qquad$ |
    R—O—CO—C—OH
    |
    R—O—CO—C—OH
    $\qquad$ |
    $\qquad$ H 9. 2-(2,4-dichlorophenoxy)ethyl 2-ethylhexanoate $\qquad$ H
    $\qquad$ |
    R—O—CO—C—C4H9
    |
    C2H5

10. Di[2-(2,4-dichlorophenoxy)ethyl]succinate

R—O—CO—CH2
    |
    R—O—CO—CH2

11. 2-(2,4-dichlorophenoxy)ethyl chloroacetate

R—O—CO—CH2Cl 12. 2-(2,4-dichlorophenoxy)ethyl acrylate

R—O—CO—CH=CH2

13. 2-(2,4-dichlorophenoxy)ethyl 2,4-dichlorophenoxy acetate

R—O—CO—CH2—O—⟨C6H3Cl2⟩—Cl 14. 2-(2,4-dichlorophenoxy)ethyl naphthenate

This material was made by reacting 2,4-dichlorophenoxy ethanol and "naphthenic acids" which is the designation of a group of carboxylic acids recovered from petroleum. "Naphthenic acids" is an isomeric mixture of low molecular weight acids and high molecular weight acids. In the lower molecular weight acids, the cyclic hydrocarbons are mono-nuclear; the higher molecular weight acids contain condensed dinuclear rings with alkyl side chains distributed around the cyclic nucleus. The acids should actually be considered as a specific class of saturated carboxylic compounds made up of acids containing a cyclopentane nucleus; they contain "grouped" hydrocarbon radicals instead of long straight chain structures. These radicals are mainly saturated five carbon ring structures containing relatively short alkyl side chains. The acids are true alicyclic acids, the carboxylic radicals being located on alkyl side chain groups which are for the most part attached to saturated cyclic pentanes.

15. 2-(2,4-dichlorophenoxy)ethyl formate

R—O—OCH 16. 2-(2,4-dichlorophenoxy)ethyl para-chlorobenzoate

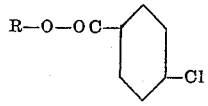

17. Di[2-(2,4-dichlorophenoxy)ethyl]phthalate

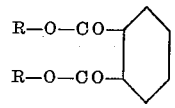

18. Di[2-(2,4-dichlorophenoxy)ethyl]maleate

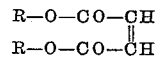
R—O—CO—CH
R—O—CO—CH 19. 2-(2,4-dichlorophenoxy)ethyl hydrogen glutarate

R—O—OC—CH₂CH₂CH₂—COOH 20. 2-(2,4-dichlorphenoxy)ethyl hydrogen oxalate

R-O-OC-COOH 21. 2-(2,4-dichlorophenoxy)ethyl hydrogen maleate

R—O—OC—CH=CH—COOH

22. Sodium 2-(2,4-dichlorophenoxy)ethyl oxalate

R—O—OC—CO—O—Na

23. Sodium 2-(2,4-dichlorophenoxy)ethyl succinate

R—O—OC—CH₂CH₂—CO—O—Na

24. Sodium 2-(2,4-dichlorophenoxy)ethyl maleate

R—O—OC—CH=CH—CO—O—Na

25. Sodium 2-(2,4-dichlorophenoxy)ethyl glutarate

R—O—CO—CH₂CH₂CH₂—CO—O—Na

26. Sodium 2-(2,4-dichlorophenoxy)ethyl chloromaleate

R—O—CO—CH=CCl—CO—O—Na

In a series of field tests, the effects of certain representative active materials were determined in pre-emergence sprays on broad leaf weeds and grass and on the crop plants field corn, snap beans, oats, and soya beans. The broad leaf weeds were purslane, carpet weed and smart weed. The grasses were crab grass and quack grass. For this test, plots of land were fitted and planted to the respective crops in the usual manner of farm practice. Certain plots were then sprayed with aqueous suspensions of the active materials in such amounts that the active materials were applied at the rate of 3 pounds per acre. Other check plots were not planted to crops nor sprayed. The sprays were applied 24 hours after the crop seeds were planted. Notations were made, about 14 days after spraying, of the condition of the crop plants and of broad leaf weeds and grass plants in the plots. The results are given in Table A. The letter ratings in the two left-hand columns represent the conditions of the weeds and grass when the notations were made. The letter ratings in the right-hand columns represent the conditions of the indicated crop plants when the notations were made.

TABLE A

*Pre-emergence sprays at 3 pounds per acre*

| Number of the Material | Weeds | | Crop Response | | | |
|---|---|---|---|---|---|---|
| | Broad leaf | Grass | Field Corn | Snap Beans | Oats | Soya Beans |
| Full Esters: | | | | | | |
| 1 | B+ | B+ | A— | A— | A | |
| 2 | E | E | A— | C, FM | A | |
| 3 | E | E | A—, FM | A | | |
| 4 | B | C | A | B—, FM | A | |
| Check | A | A | A | A | A | |
| 5 | E+ | E | | A—, FM | | |
| 6 | E | E | | A—, SFM | | B+,MFM |
| 7 | C | E | | A | | A |
| 8 | D— | E | | A—, FM | | A |
| 9 | D | C | | A—, FM | | |
| 10 | D | D | | A—, FM | | |
| 11 | C | B | | A—, FM | | |
| 12 | E | E | | A—, FM | | |
| 13 | D | C | | A—, FM | | |
| 14 | E | E | | A,—FM | | A |
| 15 | B | B | | C, FM | | |
| 16 | B | B | | A—, FM | | |
| Half Esters: | | | | | | |
| 19 | C | C | | A—, FM | | |
| 20 | D— | D | | A—, FM | | A— |
| 21 | D | C | | A—, FM | | A |
| Ester Salts: | | | | | | |
| 22 | D— | D | | A—, FM | | A— |
| 23 | D | D | | A—, FM | | A |
| 24 | C | C | | A—, FM | | A |
| 25 | C | D | | A, FM | | A |
| 26 | C+ | C | | A—, FM | | A |

In foregoing Table A, the ratings are:
A = no injury to the growth of the plant.
B = slight injury to the growth of the plant.
C = substantial injury to the growth of the plant.
D = severe injury to the growth of the plant.
E = plant dead.
The minus (—) sign indicates a little more injury than the letter indicates, for example A— indicates that the effect of the chemical can be noticed but the plant is substantially uninjured.
The plus (+) sign indicates a little less injury than the letter indicates.
FM indicates formative effects, that is that there is leaf modification or deviation from the normal pattern but apart from this the general health of the plant is that indicated by the letters A to E.
MFM indicates moderate formative effects, that is the leaflets are not as incised nor modified as much as indicated by FM.
SFM indicates severe formative effects, that is the leaves are very linear and the leaflets are deeply incised.
There was no formative effect except where indicated on the table.

In another series of field tests, the effects of the active materials were determined in post-emergence sprays on test plots. The weeds and grasses were the same as listed on Table A. The crop plants were as indicated on the following Table B. The active materials were applied in aqueous suspension at the rate of 3 pounds per acre. For the post-emergence tests, the land was fitted, planted to the respective crops and 14 days after planting the crop seeds, plots of the respective crops were sprayed with the respective sprays as indicated on Table B. The conditions of the plants were noted 30 days after spraying and are given in Table B. At the time of spraying, the corn, snap beans, oats, and soya beans were, respectively, about 4 to 6, 6 to 8, 6, and 6 inches high.

TABLE B

*Post-emergence sprays at 3 pounds per acre*

| Number of the Material | Weeds | | Crop Response | | | |
|---|---|---|---|---|---|---|
| | Broad leaf | Grass | Field Corn | Snap Beans | Oats | Soya Beans |
| Full Esters: | | | | | | |
| 1 | C | C | A | D, FM | A | |
| 2 | D− | D− | A | B, FM | A | |
| 3 | E | E | A | B−, FM | A | |
| 4 | C | C+ | A | B, FM | A | |
| Check | A | A | A | A | A | |
| 5 | E | E | | C−, FM | | |
| 6 | E | E | A−, FM | A−, FM | | |
| 7 | E | E | | A−, FM | | |
| 8 | E | E | A−, FM | A−, FM | | |
| 9 | E | E | | A− | | |
| 10 | C | C | | A− | | |
| 12 | E | E | | C, EP | | |
| 14 | B+ | E | A−, MFM | A, FM | | |
| 15 | E | E | | A−, FM | | |
| 16 | B | B | | A−, FM | | |
| 17 | C | E | A | A | | |
| 18 | E+ | E | | A− | | |
| Half Esters: | | | | | | |
| 19 | A | A | | A−FM | | |
| Check | A | A | A | A | A | A |
| 20 | A | A | | A−, FM | | A |
| 21 | E | E | | A, FM | | A |
| Ester Salts: | | | | | | |
| 22 | D | C | | A, FM | | A |
| 23 | A | B | | A−, FM | | A |
| 24 | E | E | | A− | | A |
| 25 | E | E | | A, FM | | A |
| 26 | A | A | | A−, FM | | A |

In Table B, the ratings are the same as for Table A.
EP indicates epinasty, that is that some portion of the plant has curled downward, twisted or otherwise deformed.

The materials disclosed herein may be prepared in different ways: they may be prepared by an ester interchange or by the reaction of 2-(2,4-dichlorophenoxy)-ethanol with the appropriate acid or anhydride. In those methods requiring the removal of water of reaction by an azeotropic distillation, such diluents as, for instance, benzene, toluene, xylene and dibutyl ether may be used. The reactions will occur over a considerable temperature range, for instance from 80° C. to 200° C., and higher temperatures may be used in recovering the products. Any suitable catalyst may be used, for instance sulfuric acid, para toluenesulfonic acid, methanesulfonic acid. All of the full esters are classed as water insoluble, that is less than one part, by weight, is soluble in 100 grams of water. The full esters are completely soluble in ethanol, acetone and xylene. The partial esters and the ester salts of maleic and glutaric acids are also water insoluble. The ester salts of succinic and chloromaleic acids are soluble to an extent greater than one part in 100 parts of water.

Examples of methods for preparing the materials disclosed herein are given in the following:

EXAMPLE A

Compound No. 2, 2-(2,4-dichlorophenoxy)ethyl benzoate was prepared by heating a mixture of one mole of 2-(2,4-dichlorophenoxy)ethanol, one mole of benzoic acid, 1 cc. of concentrated sulfuric acid and 300 cc. of xylene until 18 grams of water distilled from the mixture. The acid catalyst was neutralized with sodium carbonate and the product distilled under reduced pressure. 2-(2,4-dichlorophenoxy)ethyl benzoate is a white crystalline solid which boils at 185° C. at 1.5 mm. and melts at 66° C.

EXAMPLE B

Compound No. 3, di[2-(2,4-dichlorophenoxy-ethyl]-oxalate was prepared by heating a mixture containing 1 mole of 2-(2,4-dichlorophenoxy)ethanol, 0.5 mole of oxalic acid and 300 cc. of toluene at the boiling point until the theoretical quantity of water (18 grams) distilled from the mixture. The toluene was removed by a distillation under reduced pressure and the product crystallized. It is a white crystalline solid which melts at 106° C.

EXAMPLE C

Compound No. 5, 2-(2,4-dichlorophenoxy)ethyl butyrate was prepared by heating a mixture of 1 mole of 2-(2,4-dichlorophenoxy)ethanol, 1 mole of butyric acid, 400 cc. of xylene and 1 cc. of concentrated sulfuric acid until 18 grams of water distilled from the mixture. The sulfuric acid was neutralized with sodium acetate and the product distilled under reduced pressure. 2-(2,4-dichlorophenoxy)ethyl butyrate is a colorless liquid boiling at 140° C. at 2 mm. and having a specific gravity of 1.248 at 20°/20° C.

EXAMPLE D

Compound No. 6, 2-(2,4-dichlorophenoxy)ethyl acetate was prepared by adding 200 grams of acetic anhydride to a mixture of 207 grams of 2-(2,4-dichlorophenoxy)ethanol and 2 grams of para toluenesulfonic acid at 120° C. After the theoretical quantity (60 grams) of acetic acid distilled from the mixture, the catalyst was neutralized with sodium acetate and the product distilled under reduced pressure. 2-(2,4-dichlorophenoxy)ethyl acetate is a colorless liquid which boils at 140° C. at 3 mm. and has a specific gravity of 1.325 at 20°/20° C.

EXAMPLE E

Compound No. 11, 2-(2,4-dicholorphenoxy)ethyl chloroacetate was prepared by heating a mixture of 1 mole of 2-(2,4-dichlorohpenoxy)ethanol, 1 mole of chloroacetic acid, 400 cc. of xylene and 1 cc. of concentrated sulfuric acid at the boiling point until 18 grams of water distilled from the mixture. The sulfuric acid was neutralized with sodium carbonate and the product distilled under reduced pressure. 2-(2,4-dichlorophenoxy)ethyl chloroacetate is a colorless liquid boiling at 165° C. at 1 mm. and having a specific gravity of 1.420 at 20°/20° C.

EXAMPLE F

Compound No. 12, 2-(2,4-dichlorophenoxy)ethyl acrylate was prepared by heating a mixture of 1 gram mole of 2-(2,4-dichlorophenoxy)ethanol, 4 gram moles of methyl acrylate, 5 grams of pyrogallol (a polymerization inhibitor) and 5 grams of concentrated sulfuric acid (98% $H_2SO_4$, by weight) at the boiling point until the theoretical quantity (34 grams) of methanol distilled from the mixture. Sufficient sodium acetate was then added to neutralize the sulfuric acid catalyst and the product isolated by a distillation under reduced pressure. The 2-(2,4-dichlorophenoxy)ethyl acrylate is a white crystalline solid boiling at 142° to 145° C. at 2 mm. of mercury, absolute pressure, and melting at 40° C.

EXAMPLE G

Compound No. 14, 2-(2,4-dichlorophenoxy)ethyl naphthenate was prepared by heating a mixture of 207 parts of 2-(2,4-dichlorophenoxy)ethanol, 295 parts of "naphthenic" acid, 300 cc. of toluene and 2 grams of para toluenesulfonic acid until water no longer distilled from the mixture. The toluene was removed by distillation and the residue heated at 180° C. at 2 mm. to remove any low boiling material. 2-(2,4-dichlorophenoxy)ethyl naphthenate is an amber-colored viscous liquid.

The other materials contemplated herein were prepared by methods similar to those previously described, using the appropriate raw materials, solvents, and catalysts.

Compound No. 1, 2-(2,4-dichlorophenoxy)ethyl oleate was prepared according to Example C, using 1 mole of oleic acid instead of butyric acid. The final product was a yellow viscous liquid with a specific gravity of 1.058 at 20°/20° C.

Compound No. 4, di[2-(2,4-dichlorophenoxy)ethyl] 1-chloromaleate was prepared according to Example D, using ½ mole of chloromaleic anhydride instead of acetic anhydride. The final product was a yellow viscous liquid boiling at a temperature higher than 220° C. at 3 mm.

Compound No. 7, di[2-(2,4-dichlorophenoxy)ethyl]-malate was prepared according to Example E, using ½ mole of malic acid instead of 1 mole of chloroacetic acid. The final product was a slightly colored viscous liquid boiling at a temperature higher than 190° C. at 3 mm.

Compound No. 8, di[2-(2,4-dichlorophenoxy)ethyl]-tartrate was prepared according to Example E, using ½ mole of tartaric acid instead of 1 mole of chloroacetic acid. The final product was a yellow viscous liquid boiling at a temperature higher than 180° C. at 3 mm.

Compound No. 9, 2-(2,4-dichlorophenoxy)ethyl 2-ethyl hexanoate was prepared according to Example C, using 1 mole of 2-ethyl hexanoic acid instead of butyric acid. The product was a yellow liquid boiling at 169° C. at 1 mm. and having a specific gravity of 1.152 at 20°/20° C.

Compound No. 10, di[2-(2,4-dichlorophenoxy)ethyl]-succinate was prepared according to Example D, using ½ mole of succinic anhydride instead of acetic anhydride. The final product was an amber-colored liquid boiling at 285° C. at 3 mm. and having a specific gravity of 1.392 at 27°/20° C.

Compound No. 13, 2-(2,4-dichlorophenoxy)ethyl 2,4-dichlorophenoxy acetate was prepared according to Example E, using 1 mole of 2,4-dichlorophenoxy acetic acid instead of 1 mole of chloroacetic acid. The final product was a white crystalline solid melting at 76°–78° C.

Compound No. 15, 2-(2,4-dichlorophenoxy)ethyl formate was prepared according to Example C, using 1 mole of formic acid instead of butyric acid. The final product was a yellow liquid which boils at 123° C. at 2 mm. and has a specific gravity of 1.381 at 20°/20° C.

Compound No. 16, 2-(2,4-dichlorophenoxy)ethyl para-chlorobenzoate was prepared according to Example E, using 1 mole of para-chlorobenzoic acid instead of 1 mole of chloroacetic acid. The final product was a white crystalline solid which boils at 195° C. at 2.5 mm. and melts at 88° C.

Compound No. 17, di[2-(2,4-dichlorophenoxy)ethyl]-phthalate was prepared according to Example E, using ½ mole of phthalic acid instead of 1 mole of chloroacetic acid. The final product was a white crystalline solid which melts at 75° C.

Compound No. 18, di[2-(2,4-dichlorophenoxy)ethyl]-maleate was prepared according to Example D, using ½ mole of maleic anhydride instead of acetic anhydride. The final product was a yellow viscous liquid boiling at a temperature higher than 250° C. at 2 mm.

The partial esters were prepared in the manner previously described for the full esters of the polybasic acids except that the amount of acid is proportioned to the amount of alcohol so that one of the acidic groups of the acid is not esterified. Typically, a mixture of 1 gram mole of succinic anhydride, 200 cc. of toluene and 1 gram mole of 2-(2,4-dichlorophenoxy)ethanol was heated at the boiling point for 2 hours. The toluene was thereafter removed by distillation and the product, 2-(2,4-dichlorophenoxy)ethylhydrogen succinate, taken as the residue.

To prepare the ester salt, a 10% solution of ethanolic sodium hydroxide was slowly added to a mixture of 100 grams of 2-(2,4-dichlorophenoxy)ethyl hydrogen succinate and 500 cc. of ethanol until the mixture was alkaline to pH test paper. The solid, sodium 2-(2,4-dichlorophenoxy)ethyl succinate, which separated was filtered off, washed with ethanol and air dried.

Prepared in this manner:

Compound No. 19, 2-(2,4-dichlorophenoxy)ethyl hydrogen glutarate, was a solid with a melting point higher than 200° C. It is classed as water insoluble.

Compound No. 20, 2-(2,4-dichlorophenoxy)ethyl hydrogen oxalate, was a solid with a melting point of 98° C. It is classed as water insoluble.

Compound No. 21, 2-(2,4-dichlorophenoxy)ethyl hydrogen maleate, was a solid with a melting point higher than 200° C. It is classed as water insoluble.

Compound No. 22, sodium 2-(2,4-dichlorophenoxy)-ethyl oxalate, was a solid with a melting point higher than 200° C. It is classed as water insoluble.

Compound No. 23, sodium 2-(2,4-dichlorophenoxy)-ethyl succinate, was a solid with a melting point higher than 280° C. It is classed as water soluble.

Compound No. 24, sodium 2-(2,4-dichlorophenoxy)-ethyl maleate, was a solid with a melting point higher than 200° C. It is classed as water insoluble.

Compound No. 25, sodium 2-(2,4-dichlorophenoxy)-ethyl glutarate, was a solid with a melting point higher than 200° C. It is classed as water insoluble.

Compound No. 26, sodium 2-(2,4-dichlorophenoxy)-ethyl chloromaleate, was a solid with a melting point of 180° C. It is classed as water soluble.

The data previously presented indicate that the esters have such low phytotoxicity with respect to crop plants that they may be applied to fields as sprays or ducts in such effective concentrations that they prevent the growth of a large proportion of broad-leaf weed and grass seeds but do not affect too adversely the growth of crop seeds; and such drifting spray or dust as may deposit upon the parts of crop plants above the ground has substantially no effect upon the emerged crop plants. For this reason, treatment of one field does not materially affect another field nor the crop plants growing in this other field. Thus adjoining fields may be fitted and planted to a crop and treated on a regular schedule, starting with a pre-emergence treatment. The pre-emergence treatment will inhibit the germination of the majority of the grass and weed seeds, later treatments killing off such weeds and grass as may have escaped the effect of the previous treatment and having the effect of a pre-emergence treatment with respect to late germinating weed and grass seeds. None of the pre- or post-emergence treatments, however, will affect too adversely the crop plants in the treated field nor the crop plants in an adjoining field.

The preferred compounds are Nos. 2, 3, 6, 8, 14, 24, and 25 as they inhibit the germination of grass and weed seeds and also kill growing grass and weeds, and they are substantially insoluble in water. These compounds are highly effective in both pre-emergence and post-emergence applications; and due to their water insolubility they do not leach out of the soil but remain effective longer than would a water-soluble material. The characteristics of the esters generally are such that they are very effective and are effective for longer periods than the halogenated materials from which they are derived.

The compounds contemplated herein may be applied in any suitable manner. Aqueous sprays are very frequently used but many horticultural materials are used as dusts or powders, either spray or dust being applied from air-borne or from wheeled vehicles. In recent years horticultural materials have been applied as mists of concentrates or slightly diluted concentrates to save the labor of transporting large quantities of water or other extender to the fields. The materials disclosed herein may be applied in any of these ways, preferably at rates between one-half to five pounds per acre, depending upon the spray schedule and the condition of the field at the time of spraying and the general moisture conditions of the territory in which the herbicides are used. Sprays containing from 2 to 4 pounds of the compounds per 100 gallons (834 pounds) of water are satisfactory for general use, the more concentrated dispersion preferably being applied at the rate of 50 gallons per acre where the earth is at field capacity, or the climate or weather conditions are such that rain is expected or irrigation is used, and the less concentrated solution being applied at the rate of 150 gallons where the surface of the earth is dry to a depth of about one-quarter of an inch but not dusty (dry soil). With the earth at field capacity or where it will be wet thoroughly, the amount of chemical applied is preferably about 1.5 pounds per acre; about 3 pounds per acre is preferred in normally dry soil. Under average conditions, sprays containing from 2 to 3 pounds of active material per 100 gallons of water (this amount of spray being applied per acre) keeps down the weeds in a satisfactory manner, 3 pounds per 100 gallon giving excellent results consistent with low cost. At these rates, the active material may be applied without dilution or extension or with any amount or kind of extender that the horiculturist finds convenient or is in the habit of using, the object being to spread the active material evenly and have it available to the seeds and roots of the weeds and grass so that these plants will absorb it with the moisture which they normally absorb.

Dusts are usually applied at rates of from 30 to 50 pounds per acre. For dusting, the dusts should include sufficient active material to give the heretofore, stated amounts of herbicide per acre, the remainder of the 30 to 50 pounds of dust being any of the usual inert carriers, for instance talc, infusorial earth or similar extender.

With respect to the general usefulness of the esters, they are generally insoluble in water. However, the full esters are soluble in: kerosene and petroleum solvents generally; benzene, toluene, xylene and the like; acetone and ketones generally; and alcohols, of which methanol, ethanol and the propanols are generally the most practical although the higher and less volatile alcohols may be used. The solubilities of the partial esters and the ester salts are influenced by the characteristics of the unneutralized acidic groups in the partial esters and the characteristics of the salt groups in ester salts. But whatever the ester, it is soluble in one or another of the types of water-soluble and water-insoluble, volatile and non-volatile solvents, enabling fluid concentrates to be made from which aqueous suspensions and dispersions (including emulsions within these terms) may easily be prepared by the ultimate user; and by the choice of solvent, the ultimate deposit on the earth or plant may be pure toxicant, as where the solvent is volatile, for instance acetone or methanol or may be a solution of the toxicant as where the solvent is non-volatile, for instance a petroleum solvent as kerosene or a higher alcohol or ketone. Where the ester solvent is water soluble, a concentrate in the form of a solution, when beaten into water, throws out a very fine dispersion of the ester which is water insoluble; where the ester solvent is water insoluble, beating the concentrate into water gives a dispersion of the solvent having the ester in solution. Dispersing agents will maintain either dispersion to the extent desired, less agent being used for the commercial operator whose power sprayer is equipped with a beater and more for the back-yard farmer who applies the materials by means of a watering can with only occasional stirring. The preferred suspending agents are of the non-ionic type, for instance the alkyl aryl polyoxyalkylene glycols or the alkyl aryl polyether alcohols of which a number are on the market under various trade names. These materials are also wetting agents. The agents are used in the proportion of about 5% to 10% by weight on the material to be dispersed.

The compounds contemplated herein are preferably packaged as fluid concentrates or powdered concentrates containing a dispersing agent. In the case of fluid concentrates, solid toxicants are preferably dissolved in a solvent. The dispersing agent assists in the dispersion of the concentrate whether it be fluid or powder. To prepare a powder concentrate, solid toxicants may merely be powdered and mixed with the extender, if any. Liquid toxicants may be mixed with sufficient powdered extender to take up the liquid and give a powder which is preferably sufficiently dry to flow easily. Powdered concentrates may also be prepared by impregnating a solid carrier with a solution of the toxicant in a volatile solvent, volatilizing the solvent and powdering the resulting composition if necessary, thus obtaining a powdered carrier impregnated with the toxicant.

The esters contemplated herein are quite inert with respect to chemical reaction with such addends as may be incorporated in the concentrates or sprays, for instance dispersing agents, fungicides and insecticides including the contact, poison and repellent types, as nicotine sulfate, pyrethrum, allethrin, arsenates, DDT and the like.

In addition to their use for horticultural purposes, the esters may be used as intermediates, and as modifiers and preservatives in plastic, paper, cellulosic compositions and the like.

The present application is a continuation-in-part of my copending application Serial No. 69,245, filed January 4, 1949, now Patent No. 2,573,769 issued November 6, 1951.

What is claimed is:

1. An ester of 2-(2,4-dichlorophenoxy)ethanol and benzoic acid.

2. A herbicidal composition containing an ester of the formula:

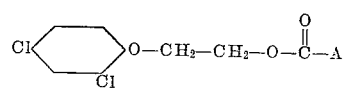

in which

contains from 1 to 18 carbon atoms and is the residue of a member of the group consisting of carboxylic acids and chlorinated carboxylic acids, A is a terminal group which is a member of the group consisting of hydrogen, alkyl, alkenyl, chlorinated alkyl, aryl, chlorinated aryl, carboxyalkyl, carboxychloroalkyl, carboxyalkenyl, carboxychloroalkenyl, neutralized carboxyalkyl, neutralized carboxychloroalkyl, neutralized carboxyalkenyl and neutralized carboxychloroalkenyl and a carrier, the ester being present in sufficient amount to render the composition toxic to weed seeds.

3. A herbicidal composition containing an ester of the formula

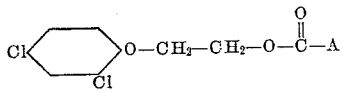

in which

contains from 1 to 18 carbon atoms and is the residue of a member of the group consisting of carboxylic acids and chlorinated carboxylic acids, A is a terminal group which is a member of the group consisting of hydrogen, alkyl, alkenyl, chlorinated alkyl, aryl, chlorinated aryl, carboxyalkyl, carboxychloroalkyl, carboxyalkenyl, carboxychloroalkenyl, neutralized carboxyalkyl, neutralized carboxychloroalkyl, neutralized carboxyalkenyl and neutralized carboxychloroalkenyl and a powder, the ester being present in sufficient amount to render the composition toxic to weed seeds.

4. A herbicidal composition containing an ester of the formula

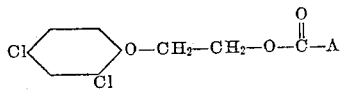

in which

contains from 1 to 18 carbon atoms and is the residue of a member of the group consisting of carboxylic acids and chlorinated carboxylic acids, A is a terminal group which is a member of the group consisting of hydrogen, alkyl, alkenyl, chlorinated alkyl, aryl, chlorinated aryl, carboxyalkyl, carboxychloroalkyl, carboxyalkenyl, carboxychloroalkenyl, neutralized carboxyalkyl, neutralized carboxychloroalkyl, neutralized carboxyalkenyl and neutralized carboxychloroalkenyl and water, the ester being present in sufficient amount to render the composition toxic to weed seeds.

5. A herbicidal composition containing an ester of the formula

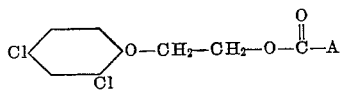

in which

contains from 1 to 18 carbon atoms and is the residue of a member of the group consisting of carboxylic acids and chlorinated carboxylic acids, A is a terminal group which is a member of the group consisting of hydrogen, alkyl, alkenyl, chlorinated alkyl, aryl, chlorinated aryl, carboxyalkyl, carboxychloroalkyl, carboxyalkenyl, carboxychloroalkenyl, neutralized carboxyalkyl, neutralized carboxychloroalkyl, neutralized carboxyalkenyl and neutralized carboxychloroalkenyl, and a solvent for the ester, the ester being present in sufficient amount to render the composition toxic to weed seeds.

6. Method of preventing the germination of seeds which comprises applying to earth containing the seeds an ester of the formula

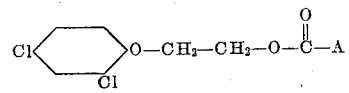

in which

contains from 1 to 18 carbon atoms and is the residue of a member of the group consisting of carboxylic acids and chlorinated carboxylic acids, A is a terminal group which is a member of the group consisting of hydrogen, alkyl, alkenyl, chlorinated alkyl, aryl, chlorinated aryl, carboxyalkyl, carboxychloroalkyl, carboxyalkenyl, carboxychloroalkenyl, neutralized carboxyalkyl, neutralized carboxychloroalkyl, neutralized carboxyalkenyl and neutralized carboxychloroalkenyl in an amount toxic to the seeds.

7. Method of preventing the germination of seeds which comprises applying to earth containing the seeds an ester of the formula

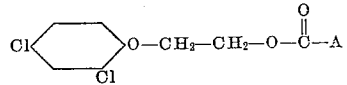

in which

contains from 1 to 18 carbon atoms and is the residue of a member of the group consisting of carboxylic acids and chlorinated carboxylic acids, A is a terminal group which is a member of the group consisting of hydrogen, alkyl, alkenyl, chlorinated alkyl, aryl, chlorinated aryl, carboxyalkyl, carboxychloroalkyl, carboxyalkenyl, carboxychloroalkenyl, neutralized carboxyalkyl, neutralized carboxychloroalkyl, neutralized carboxyalkenyl and neutralized carboxychloroalkenyl at a rate of from 0.5 pound to 5 pounds per acre.

8. Method of inhibiting the growth of grass and weeds which comprises applying to said plants an ester of the formula

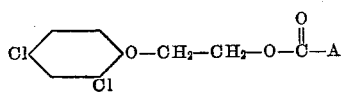

in which

contains from 1 to 18 carbon atoms and is the residue of a member of the group consisting of carboxylic acids and chlorinated carboxylic acids, A is a terminal group which is a member of the group consisting of hydrogen, alkyl, alkenyl, chlorinated alkyl, aryl, chlorinated aryl, carboxyalkyl, carboxychloroalkyl, carboxyalkenyl, carboxychloroalkenyl, neutralized carboxyalkyl, neutralized carboxychloroalkyl, neutralized carboxyalkenyl and neutralized carboxychloroalkenyl in an amount toxic to said plants.

9. A herbicidal composition containing an ester of 2-(2,4-dichlorophenoxy)ethanol and benzoic acid in an amount sufficient to render the composition toxic to weed seeds.

10. Method of preventing the germination of seeds which comprises applying to earth containing the seeds an ester of 2-(2,4-dichlorophenoxy)ethanol and benzoic acid in an amount toxic to the seeds.

11. Method of inhibiting the growth of weeds which comprises applying to said weeds an ester of 2-(2,4-dichlorophenoxy)ethanol and benzoic acid in an amount toxic to said weeds.

References Cited in the file of this patent

UNITED STATES PATENTS

| 2,394,512 | Coleman et al. | Feb. 2, 1946 |
| 2,523,188 | Britton et al. | Sept. 19, 1950 |
| 2,693,407 | Swezey | Nov. 2, 1954 |

OTHER REFERENCES

Thompson et al.: Botanical Gazette 107 (1946), pages 476 to 507.